US012754076B2

(12) United States Patent
Zhu et al.

(10) Patent No.: US 12,754,076 B2
(45) Date of Patent: Oct. 6, 2026

(54) BLUETOOTH TEMPERATURE PROBE

(71) Applicant: SHENZHEN KUKI ELECTRONIC CO., LTD., Shenzhen (CN)

(72) Inventors: Rongyuan Zhu, Shenzhen (CN); Hengshou Qiu, Shenzhen (CN)

(73) Assignee: SHENZHEN KUKI ELECTRONIC CO., LTD., Shenzhen (CN)

( * ) Notice: Subject to any disclaimer, the term of this patent is extended or adjusted under 35 U.S.C. 154(b) by 287 days.

(21) Appl. No.: 18/638,752

(22) Filed: Apr. 18, 2024

(65) Prior Publication Data

US 2024/0418576 A1 Dec. 19, 2024

(30) Foreign Application Priority Data

Jun. 17, 2023 (CN) ......................... 202321561584.0
Jun. 17, 2023 (CN) ......................... 202321565209.3

(51) Int. Cl.
*G01K 1/02* (2021.01)
*G01K 1/024* (2021.01)

(52) U.S. Cl.
CPC ............. *G01K 1/024* (2013.01); *G01K 1/026* (2013.01); *G01K 2207/06* (2013.01)

(58) Field of Classification Search
CPC ..... G01K 1/024; G01K 1/026; G01K 2207/06
See application file for complete search history.

(56) References Cited

U.S. PATENT DOCUMENTS 11,733,104 B1 * 8/2023 Zhu .......................... G01K 1/14 374/194
11,920,984 B2 * 3/2024 Lion ...................... G01K 1/024
2007/0014330 A1 * 1/2007 Hsieh ..................... G01K 13/20 374/E13.002
2012/0225170 A1 * 9/2012 Sonnendorfer ........... F24C 7/08 116/216
2014/0202244 A1 * 7/2014 Giterman ............. G01D 11/245 73/431

(Continued)

FOREIGN PATENT DOCUMENTS

EP 0710699 A1 5/1996
EP 2253669 A1 11/2010
WO 2019012324 A1 1/2019

OTHER PUBLICATIONS

First Office Action received in corresponding Korean patent application No. 20-2023-0002190, mailed Mar. 9, 2026, 14 pages.

(Continued)

*Primary Examiner* — Nathaniel T Woodward
*Assistant Examiner* — Philip L Cotey
(74) *Attorney, Agent, or Firm* — Cooper Legal Group, LLC

(57) ABSTRACT

Disclosed is a temperature probe, including a needle tube, a handle, a first temperature sensor, a PCB and an antenna; the handle is fixedly connected to the needle tube, an accommodating cavity is defined in the handle and the needle tube, respectively, the first temperature sensor, the PCB and the antenna are provided in the accommodating cavity, both of the first temperature sensor and the antenna are electrically connected to the PCB, the antenna is a hard base antenna, which includes a hard substrate and an antenna metal layer provided on the hard substrate, and a rear end of the antenna metal layer extends into the handle.

13 Claims, 7 Drawing Sheets

(56) References Cited

U.S. PATENT DOCUMENTS

| | | | | |
|---|---|---|---|---|
| 2016/0377490 | A1* | 12/2016 | Nivala | G01K 7/42<br>374/155 |
| 2017/0248474 | A1* | 8/2017 | Nielsen | G01K 1/024 |
| 2019/0250043 | A1* | 8/2019 | Wu | G01K 3/005 |
| 2019/0285483 | A1* | 9/2019 | Cheng | F24C 7/085 |
| 2019/0339133 | A1* | 11/2019 | Pulvermacher | A47J 37/0786 |
| 2020/0096393 | A1* | 3/2020 | Lion | G01K 1/024 |
| 2020/0129006 | A1* | 4/2020 | Nivala | A47J 36/321 |
| 2020/0141813 | A1* | 5/2020 | Nivala | G01K 13/00 |
| 2021/0048347 | A1* | 2/2021 | Sitaraman | G01K 1/024 |
| 2022/0049992 | A1* | 2/2022 | Nivala | G01K 1/024 |
| 2022/0333997 | A1* | 10/2022 | Newhouse | G01K 1/12 |
| 2022/0381624 | A1* | 12/2022 | Young | G01K 1/024 |
| 2023/0086159 | A1* | 3/2023 | Jee | H02J 50/10<br>219/626 |
| 2023/0213392 | A1* | 7/2023 | Wang | G01K 1/024<br>374/175 |
| 2024/0175761 | A1* | 5/2024 | Cheng | G01K 1/024 |
| 2025/0010581 | A1* | 1/2025 | Arai | B32B 27/38 |

OTHER PUBLICATIONS

Alam, T., et al., "Wideband printed patch antenna on low cost epoxy resin polymer substrate", Optoelectronics and Advanced Materials—Rapid Communications, Jul.-Aug. 2015, vol. 9, No. 7-8, pp. 1058-1063.

* cited by examiner

BLUETOOTH TEMPERATURE PROBE

CROSS-REFERENCE TO RELATED APPLICATION

The present application claims the priority benefits of China patent application No. 202321565209.3, filed on Jun. 17, 2023 and a China patent application No. 202321561584.0, filed on Jun. 17, 2023. The entireties of China patent application No. 202321565209.3 and China patent application No. 202321561584.0 are hereby incorporated by reference herein and made a part of this specification.

TECHNICAL FIELD

The present application relates to the technical field of temperature measuring instruments, and in particular, relates to a temperature probe.

BACKGROUND

Temperature probes with a BLUETOOTH® connectivity can be directly inserted into the interior of food to measure temperature, which is conductive to check real-time temperature data inside food by users and assist in intelligent cooking, thereby having wide applications. The existing temperature probes with the BLUETOOTH® connectivity generally include a needle tube, a handle, a temperature sensor, a PCB, a module with the BLUETOOTH® connectivity, an antenna, and a power supply module. In the prior art, the antenna is generally a FPC antenna. Since the temperature probes with the BLUETOOTH® connectivity are frequently exposed at high temperatures, the performance of the FPC antenna may be affected under long-term high temperatures, and further the FPC antennas have shorten service life, which needs to be improved.

SUMMARY

In order to reduce adverse effects of the existing temperature probe with a BLUETOOTH® connectivity adopting FPC antenna, the present application provides with a temperature probe with the BLUETOOTH® connectivity.

The provided technical solution of the present application is as follows. A temperature probe with the BLUETOOTH® connectivity includes a needle tube, a handle, a first temperature sensor, a printed circuit board (PCB) and an antenna, the handle is fixedly connected to the needle tube, an accommodating cavity is defined in the handle and the needle tube, respectively, the first temperature sensor, the PCB and the antenna are provided in the accommodating cavity, both of the first temperature sensor and the antenna are electrically connected to the PCB, the antenna is a hard base antenna, which includes a hard substrate and an antenna metal layer provided on the hard substrate, and a rear end of the antenna metal layer extends into the handle.

In the above technical solution, the original FPC antenna is replaced by the hard base antenna. The hard base antenna is used with the hard substrate, which has little or no deformation in high temperature environments. The antenna metal layer also has a stable position. The performance of the antenna is not easily affected, so the antenna can work stably for a long time and has a longer service life. The handle is generally made of materials with poor shielding effect. The rear end of the antenna metal layer extends into the handle, which has little impact on the signal transmission and reception of the antenna.

In an embodiment, the hard substrate is a high frequency insulation substrate, and the antenna metal layer is provided on the high frequency insulation substrate.

In the above technical solution, an operating frequency of the technology with the BLUETOOTH® connectivity is generally 2.4 GHZ, and the performance and the working stability of the antenna can be ensured by adopting the high frequency insulation substrate.

In an embodiment, a backside of the high frequency insulation substrate is provided with a charging line layer, a tail end of the handle is provided with a charging metal head, a first end of the charging line layer is electrically connected to the charging metal head, and a second end thereof is electrically connected to the PCB.

In the above technical solution, the charging line layer and the antenna metal layer in the present application are provided on two opposite surfaces of the high frequency insulation substrate, respectively, which fully utilizes the insulation performance of the high frequency insulation substrate, so the charging line layer and the antenna metal layer do not affect each other, and further the performance and service life of the antenna are not affected when charging.

In an embodiment, a material of the high frequency insulation substrate is epoxy resin, PPO resin or fluorine-based resin.

In an embodiment, the hard substrate is a copper substrate, the copper substrate is further provided with an insulation layer, and the antenna metal layer is provided on the insulation layer. The copper substrate is reused as an electrode of the charging line, and a tail end of the handle is provided with a charging metal head electrically connected to the copper substrate.

In the above technical solution, the copper substrate does not affect the function of the antenna metal layer as the antenna due to arrangement of the insulation layer, the antenna metal layer only plays a role in antenna, and is not reused as a charging electrode, which will not affect the performance of antenna.

In an embodiment, the hard substrate is an aluminum substrate, the aluminum substrate is further provided with an insulation layer, the antenna metal layer is provided on the insulation layer, the aluminum substrate is reused as an electrode of the charging line, and a tail end of the handle is provided with a charging metal head electrically connected to the aluminum substrate.

In an embodiment, a shielding tube is further provided in the accommodating cavity, the antenna is located in the shielding tube, and the rear end of the antenna extends out of the shielding tube.

In the above technical solution, the shielding tube plays a ground role in a system of the antenna. Adjusting the length of the shielding tube can change the length of the active part of antenna, thereby changing the performance of the antenna and achieving a high-level efficiency and good consistency of the antenna.

In an embodiment, the needle tube is a stainless-steel needle tube, and the handle is a ceramic handle.

In the above technical solution, the ceramic handle has poor shielding effect, and the rear end of the antenna metal layer extends into the handle, which has little impact on the signal transmission and reception of the antenna.

In an embodiment, the temperature probe with the BLUETOOTH® connectivity further includes a second temperature sensor configured to detect the environmental temperature, and the second temperature sensor is provided in the handle and electrically connected to the PCB.

In the above technical solution, the handle is far from the heat source and its temperature can basically maintain consistency with the environmental temperature, so the measured date of environmental temperature are more accurate.

In an embodiment, the temperature probe with the BLUETOOTH® connectivity further includes a connecting tube and an anti-disengagement snap-fit part, the connecting tube and the anti-disengagement snap-fit part are located in the accommodating cavity, and an outer surface at the middle of the connecting tube is provided with external threads. A front end of the handle is provided with internal threads, the connecting tube is screwed into the handle, and the anti-disengagement snap-fit part is sleeved and fixed on the connecting tube. The inner wall of the rear end of the needle tube is provided with a snap-fit slot, the anti-disengagement snap-fit part is snapped into the snap-fit slot to fix the needle tube on the anti-disengagement snap-fit part, and the rear end face of the needle tube abuts against the front end face of the handle. The connecting tube is provided with a shaft shoulder, the front end face of the shaft shoulder abuts against the rear end face of the anti-disengagement snap-fit part, and the rear end face of shaft shoulder abuts against the front end face of the handle. An annular groove is provided on the outer surface of the center of the shaft shoulder configured to accommodate the sealing ring. The anti-disengagement snap-fit part is fixedly connected to the connecting tube with glue. The anti-disengagement snap-fit part includes an annular base and a plurality of elastic cantilevers provided on the annular base, a rear end of the elastic cantilevers is provided with a snap joint facing outward, and the snap joint is matched with the snap-fit slot of the needle tube.

In summary, the present application includes at least one of the following beneficial technical effects:

1. In the present application, the original FPC antenna is replaced by the hard base antenna. The hard base antenna is used with the hard substrate, which has little or no deformation in high temperature environments. The antenna metal layer can have a stable position. The performance of the antenna is not easily affected, so the antenna can work stably for a long time and has a longer service life.
2. The handle is generally made of materials with poor shielding effect. The rear end of the antenna metal layer extends into the handle, which has little impact on the signal transmission and reception of the antenna.
3. The provided shielding tube plays a ground role in a system of the antenna. Adjusting the length of the shield tube can change the length of the active part of antenna, thereby changing the performance of the antenna and achieving a high-level efficiency and good consistency of the antenna.

DETAILED DESCRIPTION

The present application will be further described in detail below in combination with the FIGS. 1-12.

Figure 1:
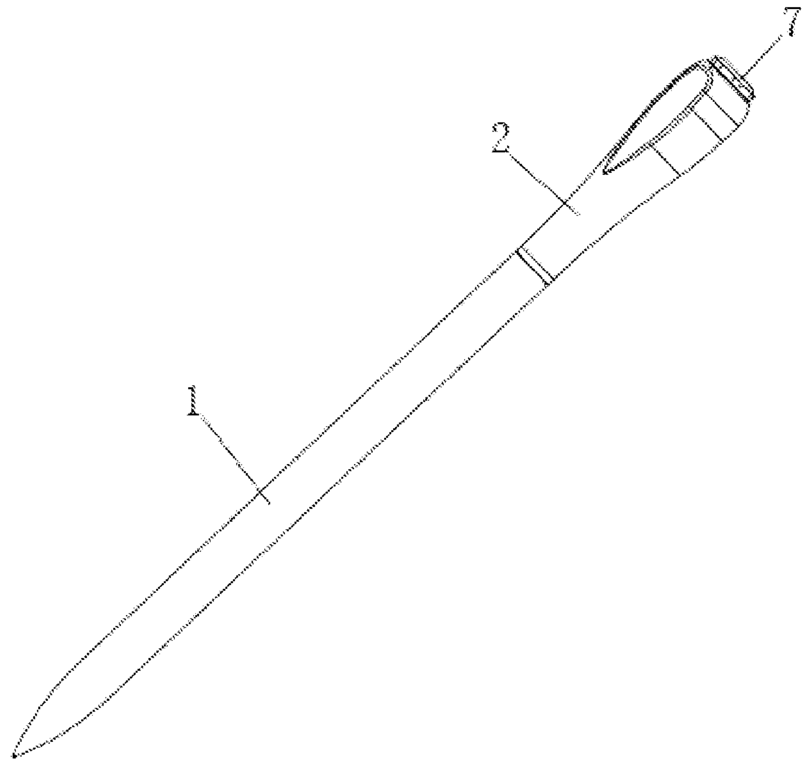
FIG. 1 illustrates a stereogram of a temperature with the BLUETOOTH® connectivity probe according to an embodiment of the present application.
Figure 2:
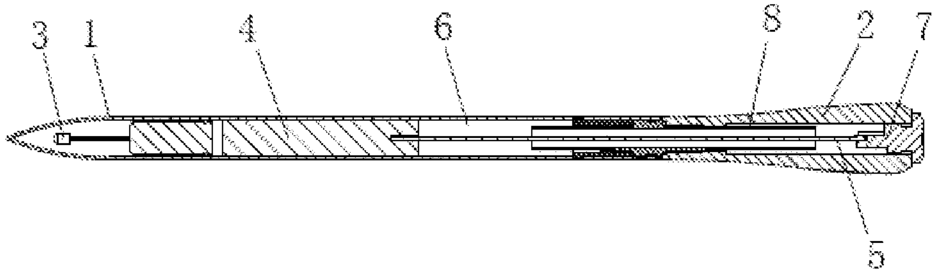
FIG. 2 illustrates a semi-section schematic diagram of a temperature probe with the BLUETOOTH® connectivity according to an embodiment of the present application.
Figure 3:
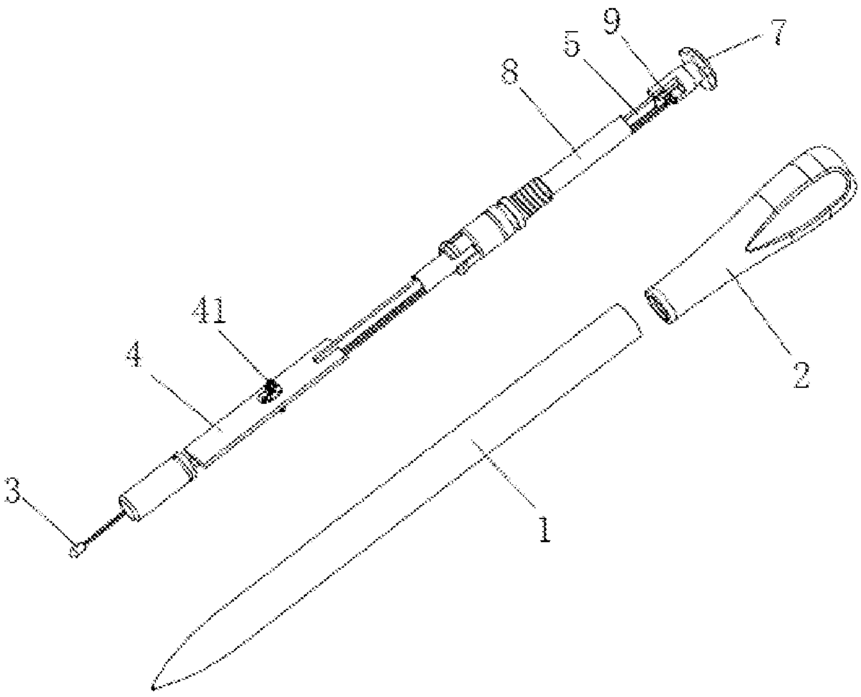
FIG. 3 illustrates an exploded-structural schematic diagram of a temperature probe with the BLUETOOTH® connectivity according to an embodiment of the present application.

Referring to FIGS. 1-3, an embodiment of the present application discloses a temperature probe with the BLUETOOTH® connectivity, including a needle tube 1, a handle 2, a first temperature sensor 3, a printed circuit board (PCB) 4 and an antenna 5, the handle 2 is fixedly connected to the needle tube 1, an accommodating cavity 6 is defined in the handle 2 and the needle tube 1. The first temperature sensor 3, the PCB 4 and the antenna 5 are provided in the accommodating cavity 6, both of the first temperature sensor 3 and the antenna 5 are electrically connected to the PCB 4, the antenna 5 is a hard base antenna, which includes a hard substrate 51 and an antenna metal layer 52 provided on the hard substrate 51, and a rear end of the antenna metal layer 52 extends into the handle 2. In this embodiment, the needle tube 1 is a stainless steel needle tube, and the handle 2 is a ceramic handle.

Figure 5:
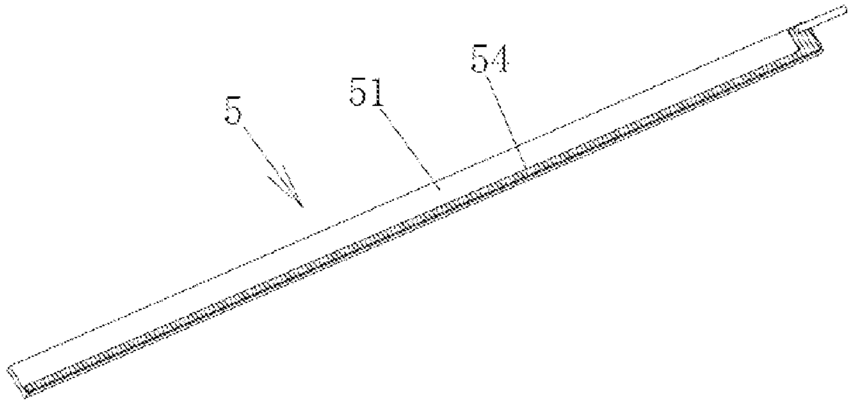
FIG. 5 illustrates a stereogram of the antenna in which the hard substrate is the high frequency insulation substrate according to an embodiment of the present application.
Figure 6:
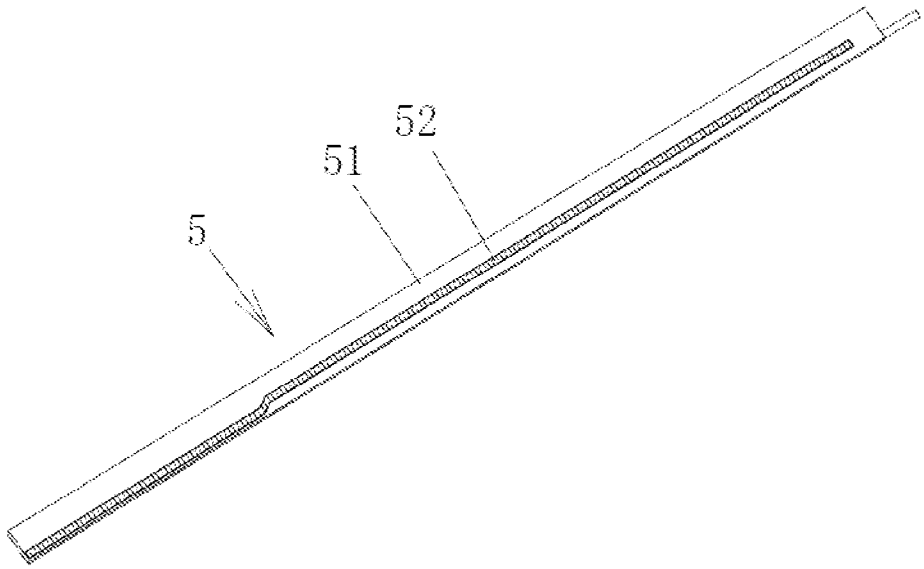
FIG. 6 illustrates a stereogram of the antenna in which the hard substrate is the high frequency insulation substrate from another perspective according to an embodiment of the present application.

Referring to FIGS. 5-6, the hard substrate 51 is a high frequency insulation substrate, and the antenna metal layer 52 is arranged on the high frequency insulation substrate, and an operating frequency of the module with the BLUETOOTH® connectivity is generally 2.4 GHz. The material of the high frequency insulation substrate is epoxy resin, PPO resin or fluorine-based resin. The high frequency insulation substrate is generally the special substrate with a high electromagnetic frequency (equal to or greater than 1 GHz), which has good heat resistance, chemical resistance, high impact strength, good peel strength, and low water absorption. When the high frequency insulation substrate is damp, the dielectric constant and dielectric loss thereof are not easy to be affected, and the thermal expansion coefficient thereof is similar as that of the antenna metal layer 52 (copper foil), thereby preventing the antenna metal layer 52 from separating during the process of hot and cold changes.

Referring to FIG. 5, the backside of the high frequency insulation substrate is provided with a charging line layer 54, a tail end of the handle 2 is provided with a charging metal head 7, a first end of the charging line layer 54 is electrically connected to the charging metal head 7, and a second end thereof is electrically connected to the PCB 4. The charging metal head 7 and the needle tube 1 are as positive pole and negative pole of the charging circuit, respectively, and an internal power supply module is charged by the PCB 4. In the traditional technical solution, the antenna is reused as a charging line, which seriously affects the service life of the antenna, and further easily affects the performance thereof. In the present application, the charging line layer 54 and the antenna metal layer 52 are provided on two opposite surfaces of the high frequency insulation substrate, respectively, which fully utilize the insulation performance of the high frequency insulation substrate, so the charging line layer 54 and the antenna metal layer 52 do not affect each other, and further the performance and service life of the antenna 5 are not affected when charging.

When designing and debugging the general built-in antennas, the dielectric constants of the surrounding materials in the specific used environment of the antenna needs to be considered, in which the most thereof are required with customized design, which have poor universality and long development cycle.

Figure 4:
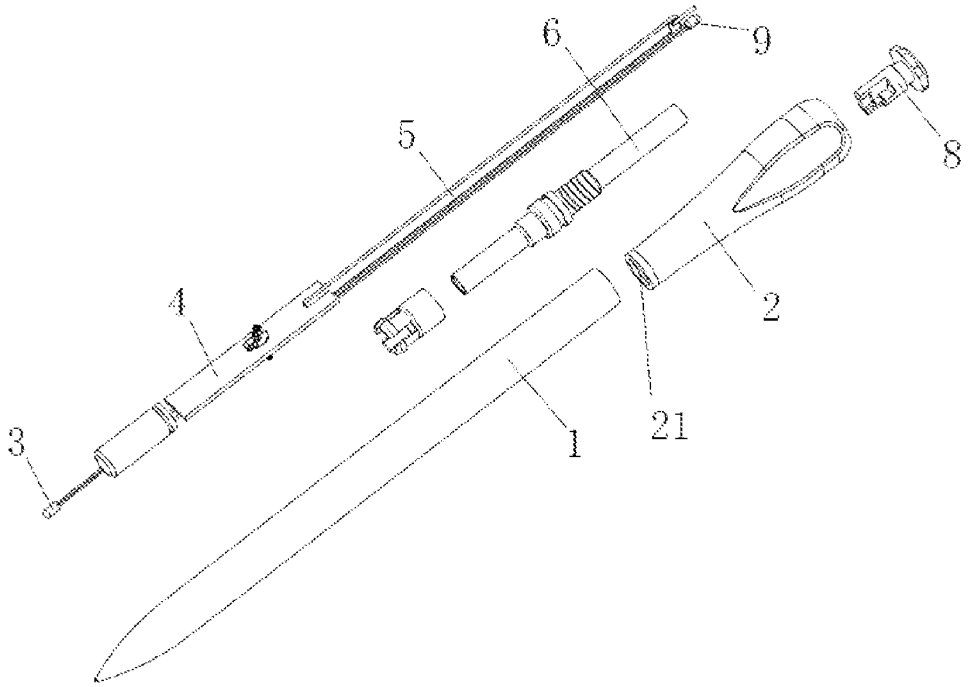
FIG. 4 illustrates an exploded-structural schematic diagram of a temperature probe with the BLUETOOTH® connectivity from another perspective according to an embodiment of the present application.

Referring to FIGS. 3-4, a shielding tube 8 is further arranged in the accommodating cavity 6. The antenna 5 is located in the shielding tube 8, and the rear end of the antenna 5 extends out of the shielding tube 8. The shielding tube 8 plays a ground role in a system of the antenna 5. Adjusting the length of the shielding tube 8 can change the length of the active part of antenna 5, thereby changing the performance of the antenna 5 and achieving a high-level efficiency and good consistency of the antenna 5. The temperature probe with the BLUETOOTH® connectivity with different specifications and models can use the same antenna 5 by only adjusting the length of the shielding tube 8, which has good versatility and can shorten the development cycle. A cross-sectional shape of the shielding tube 8 can be circular, elliptical, polygonal or other various shapes, and the shielding tube 8 can be stainless steel shielding tube, copper shielding tube, aluminum shielding tube, or other various metal tubes.

Referring to FIG. 3, the temperature probe with the BLUETOOTH® connectivity further includes a second temperature sensor 9 configured to detect the environmental temperature, and the second temperature sensor 9 is arranged in the handle 2 and electrically connected to the PCB 4. The handle 2 is far from the heat source and its temperature can basically maintain consistency with the environmental temperature, so the measured data of environmental temperature are more accurate.

Figure 7:
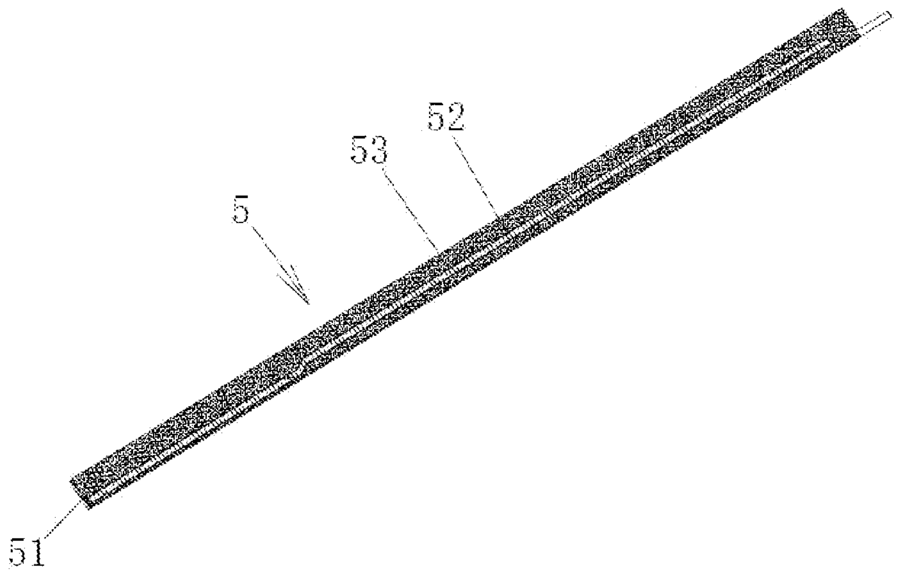
FIG. 7 illustrates a stereogram of the antenna in which the hard substrate is the copper substrate according to an embodiment of the present application.
Figure 8:
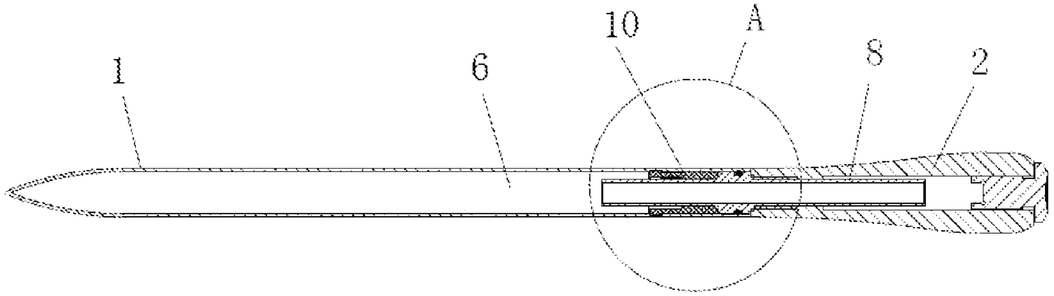
FIG. 8 illustrates a semi-section schematic diagram of a temperature probe with the BLUETOOTH® connectivity according to an embodiment of the present application (hiding a plurality of internal elements)

In another embodiment of the antenna of the present application, referring to FIG. 7, the hard substrate 51 is a copper substrate, the copper substrate is further provided with an insulation layer 53, the antenna metal layer 52 is provided on the insulation layer 53, which does not affect the function as an antenna of the antenna metal layer 52. The copper substrate is reused as an electrode of the charging line, and a tail end of the handle 2 is provided with a charging metal head 7 electrically connected to the copper substrate. The antenna metal layer 52 only plays a role in antenna 5, and is not reused as a charging electrode, which will not affect the performance of antenna 5.

In this embodiment, the copper substrate can further be replaced by the aluminum substrate, the aluminum substrate is further provided with an insulation layer, and the antenna metal layer is provided on the insulation layer. The aluminum substrate is reused as an electrode of the charging line, and a tail end of the handle is provided with a charging metal head electrically connected to the aluminum substrate, which has the same technical effect.

The implementation principle of the present application is as follows. In the present application, the original FPC antenna is replaced by the hard base antenna 5. The hard base antenna is the hard substrate 51, which has little or no deformation in high temperature environments. The antenna metal layer 52 can have a stable position. The performance of the antenna 5 is not easily affected, so the antenna 5 can work stably for a long time and has a longer service life. The handle 2 is generally made of materials with poor shielding effect. The rear end of the antenna metal layer 52 extends into the handle 2, which has little impact on the signal transmission and reception of the antenna 5.

Referring to FIGS. 8-12, this embodiment further discloses a connecting fixed structure of needle tube 1 and handle 2. The temperature probe with the BLUETOOTH® connectivity further includes a connecting tube 10 and an anti-disengagement snap-fit part 11, the connecting tube 10 and the anti-disengagement snap-fit part 11 are located in the accommodating cavity 6, and an outer surface at the middle of the connecting tube 10 is provided with external threads 101. The front end of the handle 2 is provided with an internal thread 21, the connecting tube 10 is screwed into the handle 2, and the anti-disengagement snap-fit part 11 is sleeved and fixed on the connecting tube 10. The inner wall of the rear end of the needle tube 1 is provided with a snap-fit slot 1A, the anti-disengagement snap-fit part 11 is snapped into the snap-fit slot 1A to fix the needle tube 1 on the anti-disengagement snap-fit part 11, and the rear end face of the needle tube 1 abuts against the front end face of the handle 2.

Figure 9:
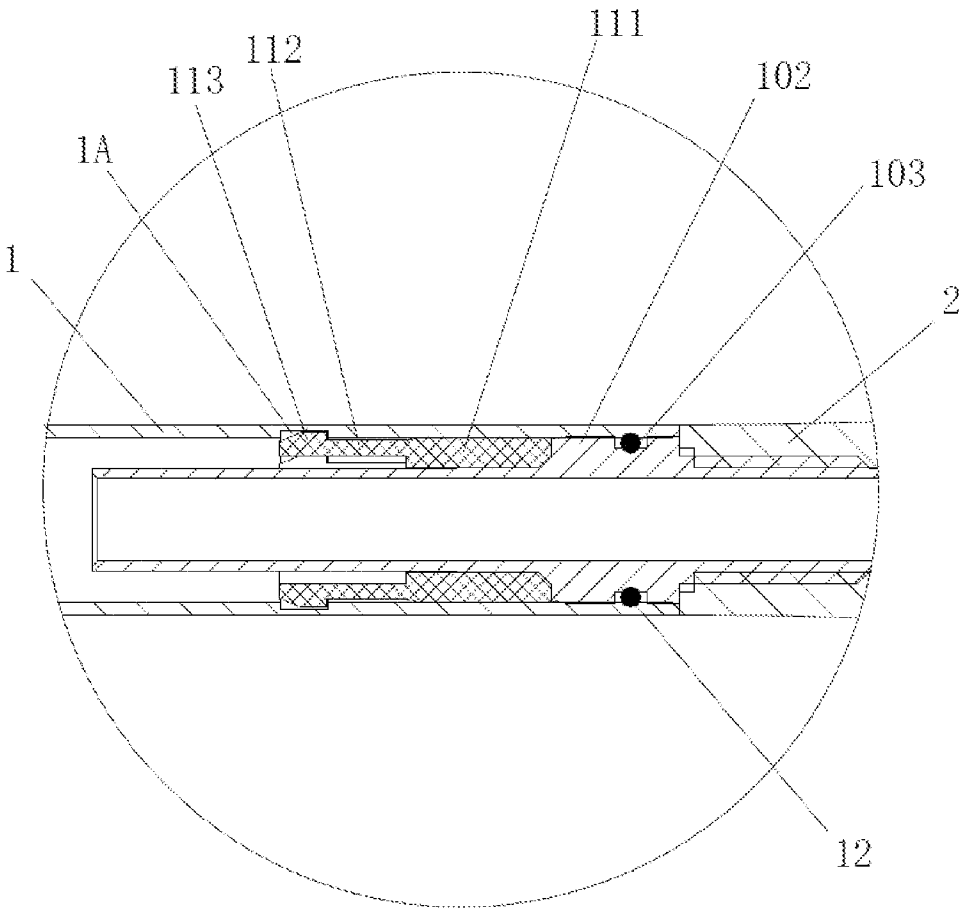
FIG. 9 is an enlarged schematic view of portion A in FIG. 8.

Referring to FIG. 9, the connecting tube 10 is provided with shaft shoulder 102, the front end face of the shaft shoulder 102 abuts against the rear end face of the anti-disengagement snap-fit part 11, and the rear end face of shaft shoulder 102 abuts against the front end face of the handle 2. The position effect of the shaft shoulder 102 can ensure the position consistency of the handle 2 and the anti-disengagement snap-fit part 11 at the connecting tube 10, so it can ensure that there is a minimal assembly clearance between the needle tube 1 and handle 2. An annular groove 103 is provided on the outer surface of the center of the shaft shoulder 102, which is configured to accommodate the sealing ring 12 to prevent moisture and water from entering the accommodating cavity 6.

Figure 10:
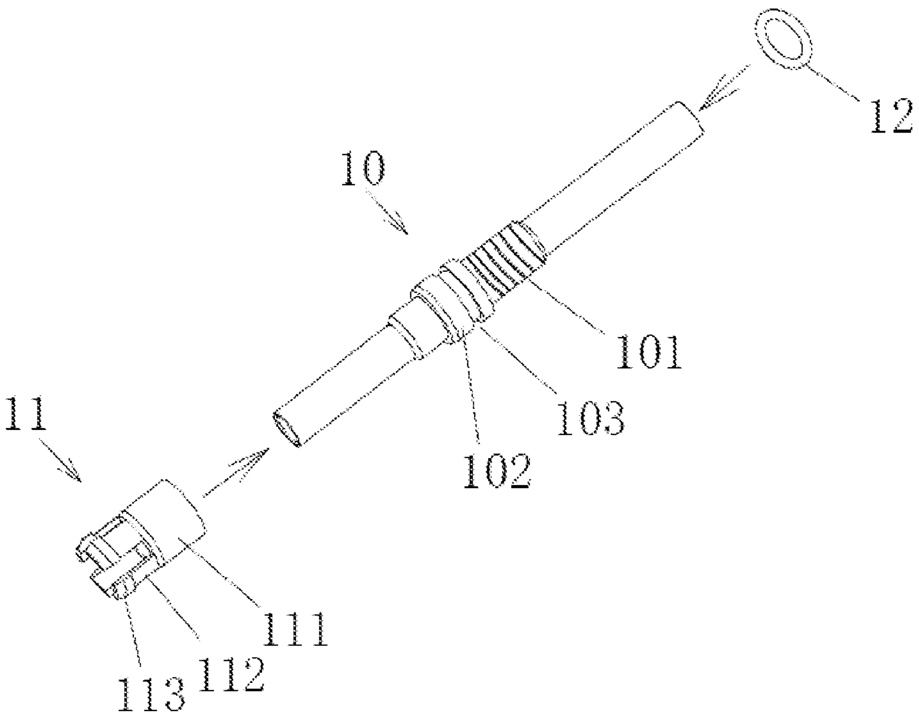
FIG. 10 illustrates a schematic diagram of the connecting tube, the anti-disengagement snap-fit part and the sealing ring when being assembled according to an embodiment of the present application.

Referring to FIG. 10, the anti-disengagement snap-fit part 11 is fixedly connected to the connecting tube 10 by a glue to ensure the reliability of the fixing connection. The anti-disengagement snap-fit part 11 includes an annular base 111 and a plurality of elastic cantilevers 112 provided on the annular base 111, the rear end of the elastic cantilevers 112 is provided with a snap joint 113 facing outward, and the snap joint 113 is matched with the snap-fit slot 1A of the needle tube 1. The number of elastic cantilevers 112 and snap joints 113 is four, respectively, which have multiple force points and balanced fixing force.

Figure 11:
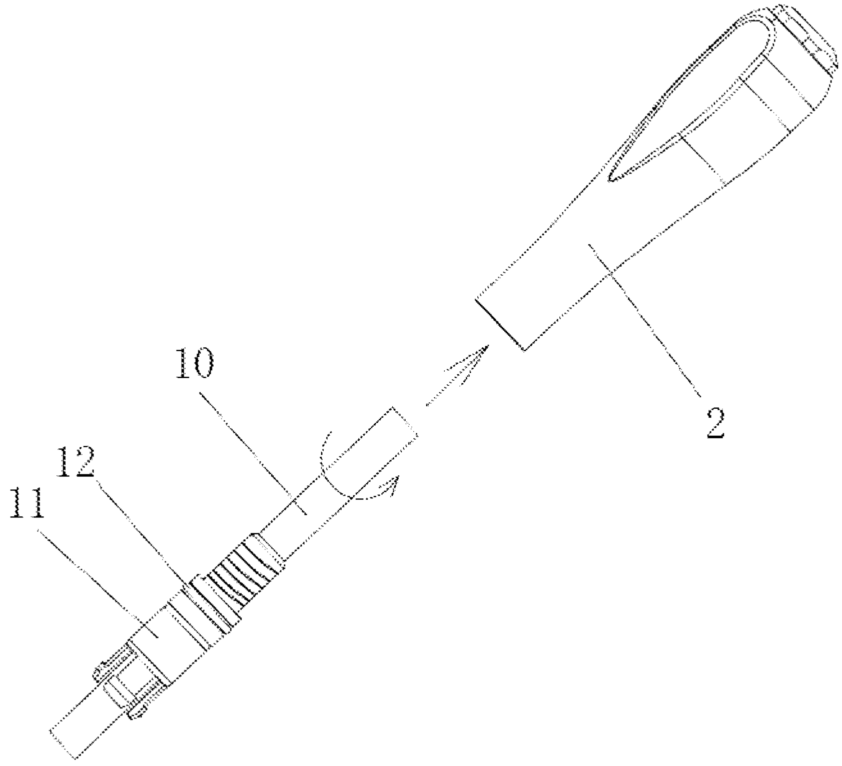
FIG. 11 illustrates a schematic diagram of the connecting tube and the handle when being assembled according to an embodiment of the present application.
Figure 12:
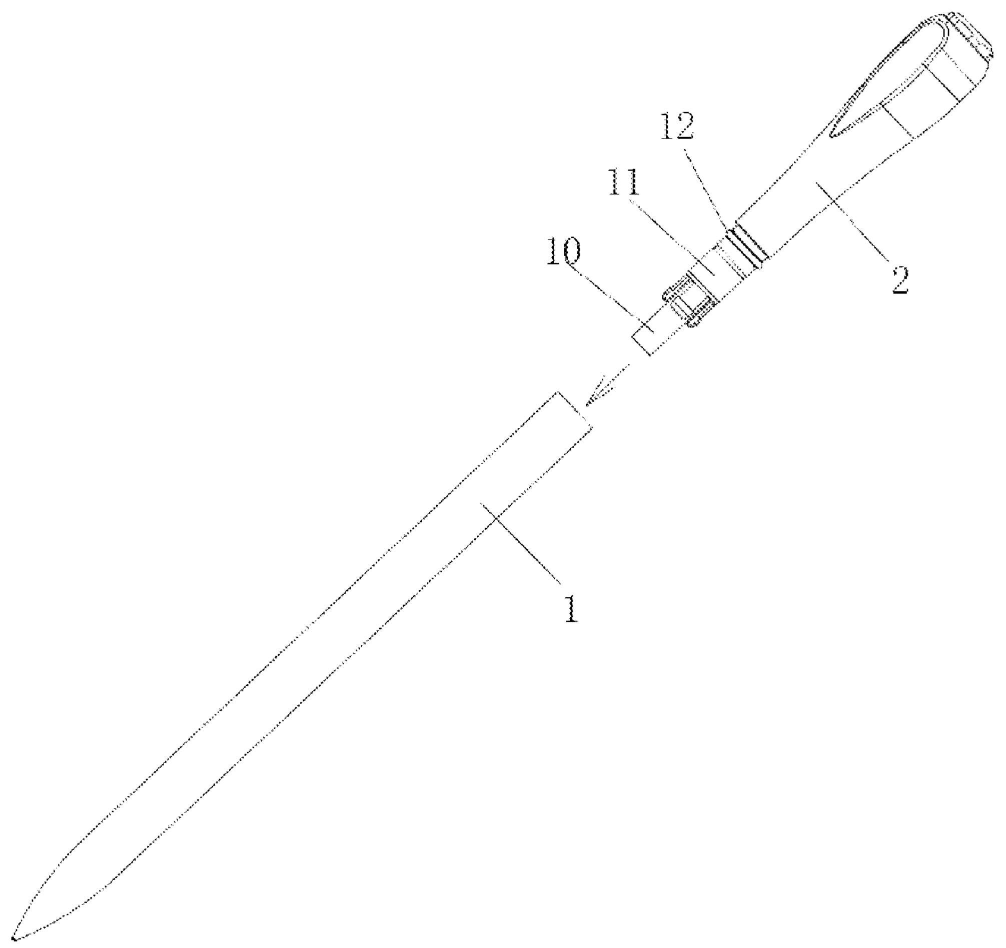
FIG. 12 illustrates a schematic diagram of the anti-disengagement snap-fit part and the needle tube when being assembled according to an embodiment of the present application.

The specific assembly process in this embodiment is as follows. Referring to FIG. 10, the sealing ring 12 is arranged on the anti-disengagement snap-fit part 11, a glue is coated on the connecting tube 10, and the anti-disengagement snap-fit part 11 is stuck with the connecting tube 10. Referring to FIG. 11, the connecting tube 10 is rotated to the handle 2. Referring to FIG. 12, finally, the anti-disengagement snap-fit part 11 is inserted into the needle tube 1 and buckled it. When the anti-disengagement snap-fit part 11 is inserted into the needle tube 1, the elastic cantilever 112 will be squeezed inward and deformed elastically. When the snap joint 113 reaches the snap-fit slot 1A, the elastic cantilever 112 will restore deformation outward, the snap joint is snapped into the snap-fit slot 1A, so the needle tube 1 is fixedly connected to the anti-disengagement snap-fit part 11, and they will not easily be detached due to a strong pulling force.

The needle tube of traditional temperature probe with the BLUETOOTH® connectivity is generally reused as an electrode of charging line. The PCB is provided with a metal elastic tab, and the needle tube is electrically connected to the PCB through the metal elastic tab. Since the needle tube is threadedly connected to the handle, when the needle tube rotate relative to the handle, the metal elastic tab will rub against the inner wall of the needle tube, the PCB will produce torsional force due to the frictional force, which can easily generate adverse effects on the connecting structures of the PCB and antenna. In the present application, the connecting tube 10 and the anti-disengagement snap-fit part 11 are provided as the intermediate connectors. The anti-disengagement snap-fit part 11 is fixedly provided on the connecting tube 10 and they are formed integrally. The connecting tube 10 is rotated to the handle 2, and the anti-disengagement snap-fit part 11 is snapped into the needle tube 1 to fix the needle tube 1 to the anti-disengagement snap-fit part 11. Since the needle tube 1 is inserted into the anti-disengagement snap-fit part 11 in a straight line, so they do not need to be rotated relative to each other, the metal elastic tab 41 on the PCB 4 will not produce torsional force to the PCB 4, which will not generate adverse effects on the connecting structures of the PCB 4 and antenna 5. The above are the preferred embodiments of the present application, which are not intended to limit the protection scope of the present application. Therefore, all equivalent changes made according to the structure, shape and principle of the present application should be covered within the protection scope of the present application.

LIST OF REFERENCE SIGNS

1. needle tube; 1A. snap-fit slot; 2. Handle; 21. internal thread; 3. first temperature sensor; 4. printed circuit board (PCB); 41. metal elastic tab; 5. Antenna; 51. hard substrate; 52. antenna metal layer; 53. insulation layer; 54. charging line layer; 6. accommodating cavity; 7. charging metal head; 8. shielding tube; 9. second temperature sensor; 10. connecting tube; 101. external thread; 102. shaft shoulder; 103. annular groove; 11. anti-disengagement snap-fit part; 111. annular base; 112. elastic cantilever; 113. snap joint; and 12. sealing ring.

What is claimed is:

1. A temperature probe, comprising: a needle tube, a handle, a first temperature sensor, a printed circuit board (PCB) and an antenna, wherein the handle is fixedly connected to the needle tube, an accommodating cavity is provided in the handle and the needle tube, the first temperature sensor, the PCB and the antenna are arranged in the accommodating cavity, the first temperature sensor and the antenna are electrically connected to the PCB, the antenna is a hard base antenna, the antenna comprises a substrate and an antenna metal layer provided on the substrate, and a rear end of the antenna metal layer extends into the handle, the temperature probe further comprises: a connecting tube and an anti-disengagement snap-fit part, wherein the connecting tube and the anti-disengagement snap-fit part are arranged in the accommodating cavity, an outer surface at a middle portion of the connecting tube is provided with external threads, a front end of the handle is provided with internal threads, the connecting tube is screwed into the handle, the anti-disengagement snap-fit part is sleeved and fixed on the connecting tube, an inner wall of a rear end of the needle tube is provided with a snap-fit slot, the anti-disengagement snap-fit part is snapped into the snap-fit slot to fix the needle tube on the anti-disengagement snap-fit part, and a rear end face of the needle tube abuts against a front end face of the handle.

2. The temperature probe according to claim 1, wherein the substrate is a high frequency insulation substrate, and the antenna metal layer is provided on the high frequency insulation substrate.

3. The temperature probe according to claim 2, wherein a charging line layer is provided on a backside of the high frequency insulation substrate, a tail end of the handle is provided with a charging metal head, a first end of the charging line layer is electrically connected to the charging metal head, and a second end of the charging line layer is electrically connected to the PCB.

4. The temperature probe according to claim 2, wherein the high frequency insulation substrate is made of epoxy resin, poly(p-phenylene oxide) (PPO) resin or fluorine-based resin.

5. The temperature probe according to claim 1, wherein the substrate is a copper substrate, the copper substrate is further provided with an insulation layer, the antenna metal layer is provided on the insulation layer, the copper substrate is further used as an electrode of a charging line, and a tail end of the handle is provided with a charging metal head electrically connected to the copper substrate.

6. The temperature probe according to claim 1, wherein the substrate is an aluminum substrate, the aluminum substrate is further provided with an insulation layer, the antenna metal layer is provided on the insulation layer, the aluminum substrate is further reused as an electrode of a charging line, and a tail end of the handle is provided with a charging metal head electrically connected to the aluminum substrate.

7. The temperature probe according to claim 1, wherein a shielding tube is provided in the accommodating cavity, the antenna is arranged in the shielding tube, and a rear end of the antenna extends out of the shielding tube.

8. The temperature probe according to claim 1, wherein the needle tube is a stainless-steel needle tube, and the handle is a ceramic handle.

9. The temperature probe according to claim 1, further comprising: a second temperature sensor configured to detect environmental temperature, wherein the second temperature sensor is arranged in the handle and electrically connected to the PCB.

10. The temperature probe according to claim 1, wherein the connecting tube is provided with a shaft shoulder, a front end face of the shaft shoulder abuts against a rear end face of the anti-disengagement snap-fit part, and a rear end face of shaft shoulder abuts against the front end face of the handle.

11. The temperature probe according to claim 10, wherein an annular groove is provided on an outer surface at a middle of the shaft shoulder for accommodating a sealing ring.

12. The temperature probe according to claim 1, wherein the anti-disengagement snap-fit part is fixed on the connecting tube with glue.

13. The temperature probe according to claim 1, wherein the anti-disengagement snap-fit part comprises an annular base and a plurality of elastic cantilevers provided on the annular base, a rear end of each of the plurality of elastic cantilevers is provided with a snap joint facing outward, and the snap joint is matched with the snap-fit slot of the needle tube.

* * * * *